United States Patent
Yackley et al.

(10) Patent No.: US 11,611,645 B2
(45) Date of Patent: Mar. 21, 2023

(54) ROTARY PHONE RECORDING DEVICE

(71) Applicant: After The Tone, LLC, San Juan Capistrano, CA (US)

(72) Inventors: Jacob Yackley, Rancho Mission Viejo, CA (US); Matthew Rullo, Patchogue, NY (US)

(73) Assignee: After the Tone, LLC, San Clemente, CA (US)

( * ) Notice: Subject to any disclaimer, the term of this patent is extended or adjusted under 35 U.S.C. 154(b) by 0 days.

(21) Appl. No.: 17/831,402

(22) Filed: Jun. 2, 2022

(65) Prior Publication Data

US 2022/0394121 A1 Dec. 8, 2022

Related U.S. Application Data

(60) Provisional application No. 63/196,566, filed on Jun. 3, 2021.

(51) Int. Cl.
*H04M 1/658* (2006.01)
*H04M 1/654* (2006.01)
*H04M 1/23* (2006.01)

(52) U.S. Cl.
CPC ............. *H04M 1/658* (2013.01); *H04M 1/23* (2013.01); *H04M 1/654* (2013.01)

(58) Field of Classification Search
CPC ......... H04M 1/658; H04M 1/23; H04M 1/654
See application file for complete search history.

(56) References Cited

U.S. PATENT DOCUMENTS

| 3,748,402 | A | * | 7/1973 | Yussen | H04M 17/02 |
| | | | | | 379/200 |
| 2002/0110224 | A1 | * | 8/2002 | Kovales | H04M 3/533 |
| | | | | | 379/67.1 |
| 2010/0260247 | A1 | * | 10/2010 | Albiston | H04B 3/548 |
| | | | | | 375/222 |
| 2013/0287400 | A1 | * | 10/2013 | Hurwitz | H04M 11/025 |
| | | | | | 398/79 |
| 2019/0141800 | A1 | * | 5/2019 | Rhodes | H05B 47/19 |

* cited by examiner

*Primary Examiner* — Farid Seyedvosoghi
(74) *Attorney, Agent, or Firm* — Katherine B. Sales, Esq.; Concourse Law Group

(57) ABSTRACT

A recording device comprising a base having an upper surface and a lower surface, a top cover, a plurality of feet coupled to the lower surface of the base, a terminal network coupled to the upper surface of the base, a hook switch coupled to the upper surface of the base and electrically coupled to the terminal network, an XLR connector coupled to the internal surface of the top cover and electrically coupled to the terminal network, a ground lug coupled to the upper surface of the base and electrically coupled to the XLR connector, a rotary dial coupled to the base, and a handset removably supported by the top cover and electrically coupled to the terminal network by a telephone wire. A method of using the same to record a message.

18 Claims, 3 Drawing Sheets

ROTARY PHONE RECORDING DEVICE

CROSS-REFERENCE TO RELATED APPLICATIONS

This application claims priority to U.S. Patent Application No. 63/196,566, titled "Rotary Phone Recording Device," filed Jun. 3, 2021, the contents of which are incorporated by reference herein in their entirety.

BACKGROUND

It has become popular to provide a guestbook at certain events, such as weddings, birthday parties, anniversaries, etc. for the guests to leave notes and well wishes to the host. However, having to actually handwrite a note or well wish can be a deterrent for some guests.

Accordingly, there is a need for recording device that allows guests to leave notes and well wishes without having to actually write them out.

SUMMARY

The present invention addresses this need. The present invention is directed to a recording device having a base, a top cover, a handset, a plurality of feet, a terminal network, a hook switch, an XLR connector, a ground lug, and a rotary dial.

The base has an upper surface and a lower surface, and the top cover is removably coupled to the base.

Optionally, the top cover has an internal surface, an external surface, a central opening, and at least one support.

The handset is removably supported by the top cover and electrically coupled to the terminal network by a telephone wire.

Optionally, the handset has a first end that contains a microphone, a second end that contains a speaker, and a central handle portion disposed between the two ends.

The plurality of feet are coupled to the lower surface of the base for supporting the device.

The terminal network and the hook switch are coupled to the upper surface of the base, and the hook switch is electrically coupled to the terminal network. Optionally, the hook switch extends up into the at least one support of the top cover when the top cover is coupled to the base.

The XLR connector is coupled to the internal surface of the top cover and is electrically coupled to the terminal network.

The ground lug is coupled to the upper surface of the base and is electrically coupled to the XLR connector.

The rotary dial is coupled to the base and can be configured to extend through the central opening of the top cover.

A method of using the recording device comprises the steps of: a) providing the device; b) lifting the handset from the device; c) listening to the pre-recorded message; d) speaking into the handset to leave a new message; and e) recording and saving the new message.

DRAWINGS

These and other features, aspects, and advantages of the present invention will become better understood with regard to the following description, appended claims, and accompanying drawings.

DESCRIPTION

Figure 1:
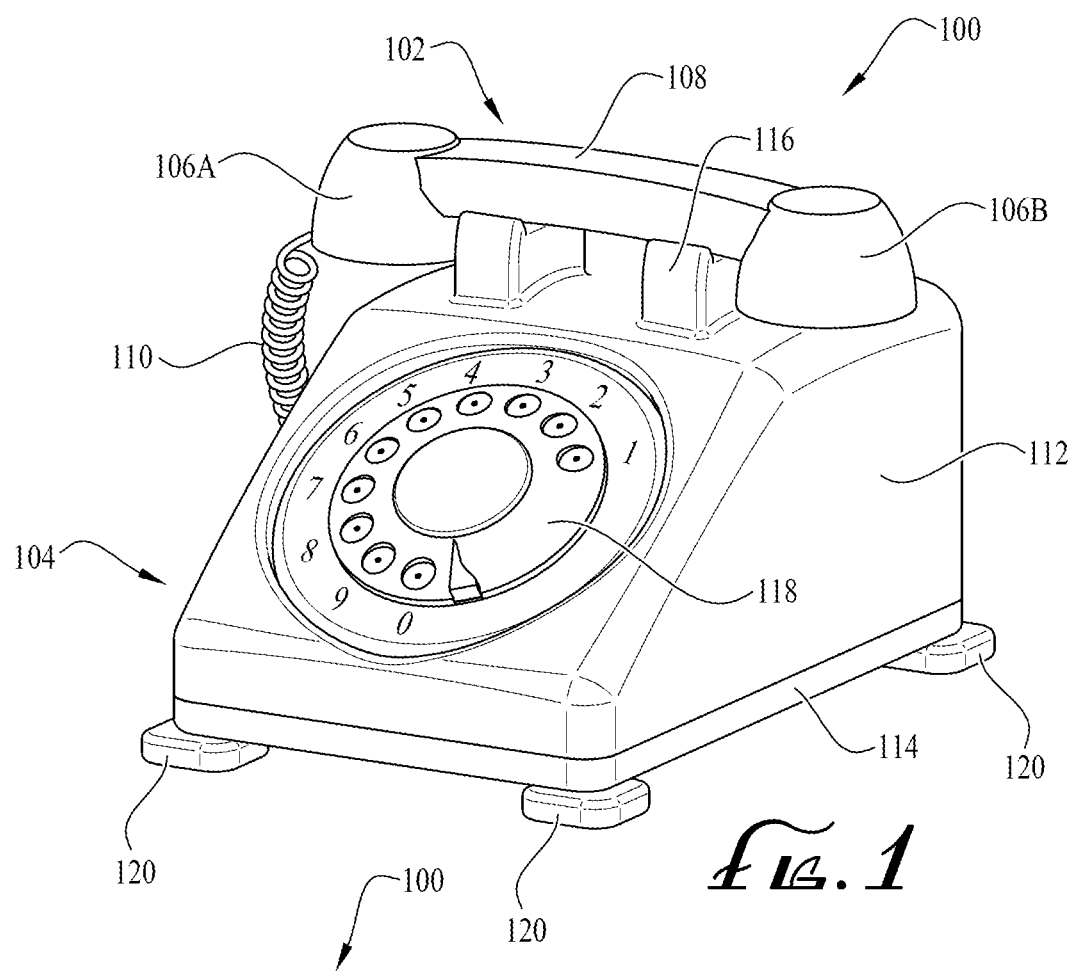
FIG. 1 is a front perspective view of a rotary phone recording device having features of the present invention.
Figure 2:
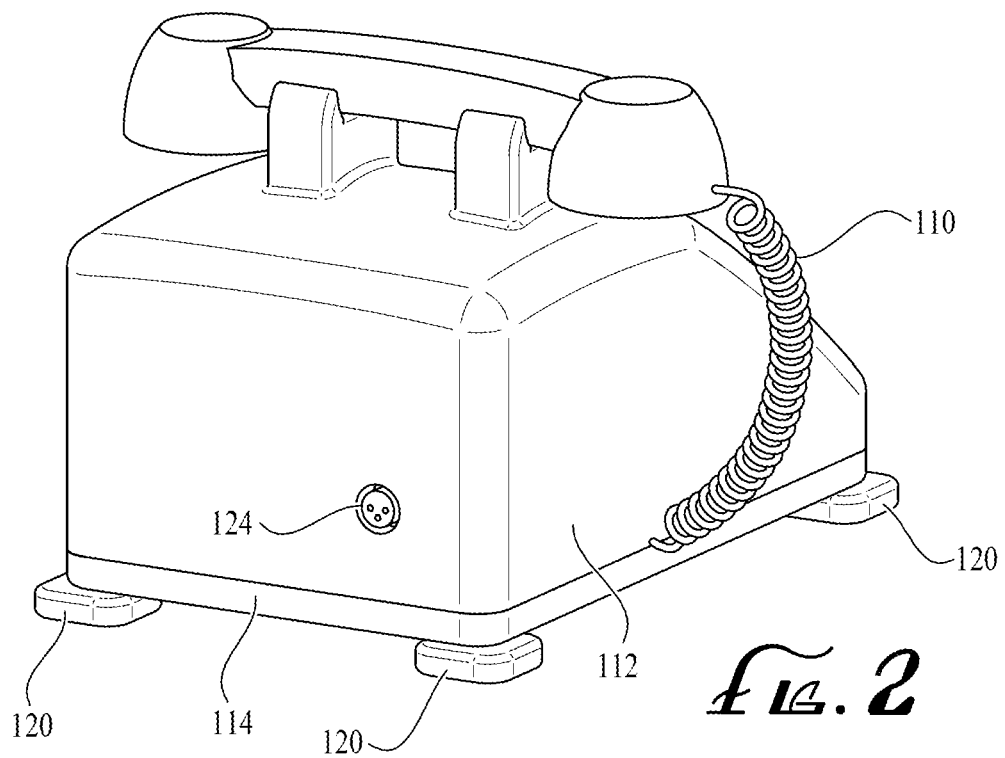
FIG. 2 is a rear perspective view of the recording device of FIG. 1.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

The terms "computer," "computer device," and "server" as used herein, refers to a device and/or system of devices that include at least one computer processing element, e.g., a central processing unit (CPU), and some form of computer memory having a capability to store data. The computer may comprise hardware, software, and firmware for receiving, storing, and/or processing data as described below. For example, a computer or computer device may comprise any of a wide range of digital electronic devices, including, but not limited to, a server, a desktop computer, a laptop, a smart phone, a tablet, or any form of electronic device capable of functioning as described herein.

The term "database" as used herein, refers to any form of one or more (or combination of) relational databases, object-oriented databases, hierarchical databases, network databases, non-relational (e.g. NoSQL) databases, document store databases, in-memory databases, programs, tables, files, lists, or any form of programming structure or structures that function to store data as described herein.

The term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Referring now to FIG. 1 through 4, the invention is directed to a recording device 100. The recording device 100 has a handset 102 and a body 104. The handset 102 is preferably in the shape of an old telephone handle, having two ends 106 coupled by a handle portion 108. As is typical with an old telephone handle, one of the ends 106A contains a microphone into which a user speaks, and the other end 106B contains a speaker which projects sound and to which the user listens.

The handset 102 is coupled to the body 104 via a telephone wire 110. The wire 110 electrically couples the internal components of the handset (microphone and speaker) to at least one internal component of the body 104.

The body 104 comprises a top cover 112 and a base 114, which are removably coupled to each other. The top cover 112 has an internal surface and an external surface, and the base 114 has an upper surface and a lower surface. There is at least one support 116 coupled to the external surface of the top cover 112 for supporting the handset 102. Preferably, the body 104 also comprises a rotary dial 118 that extends through an opening in the top cover 112, which adds to the nostalgia of the device 100. Optionally, the device 100 can comprise one or more feet 120 coupled to the lower surface of the base 114.

Figure 3:
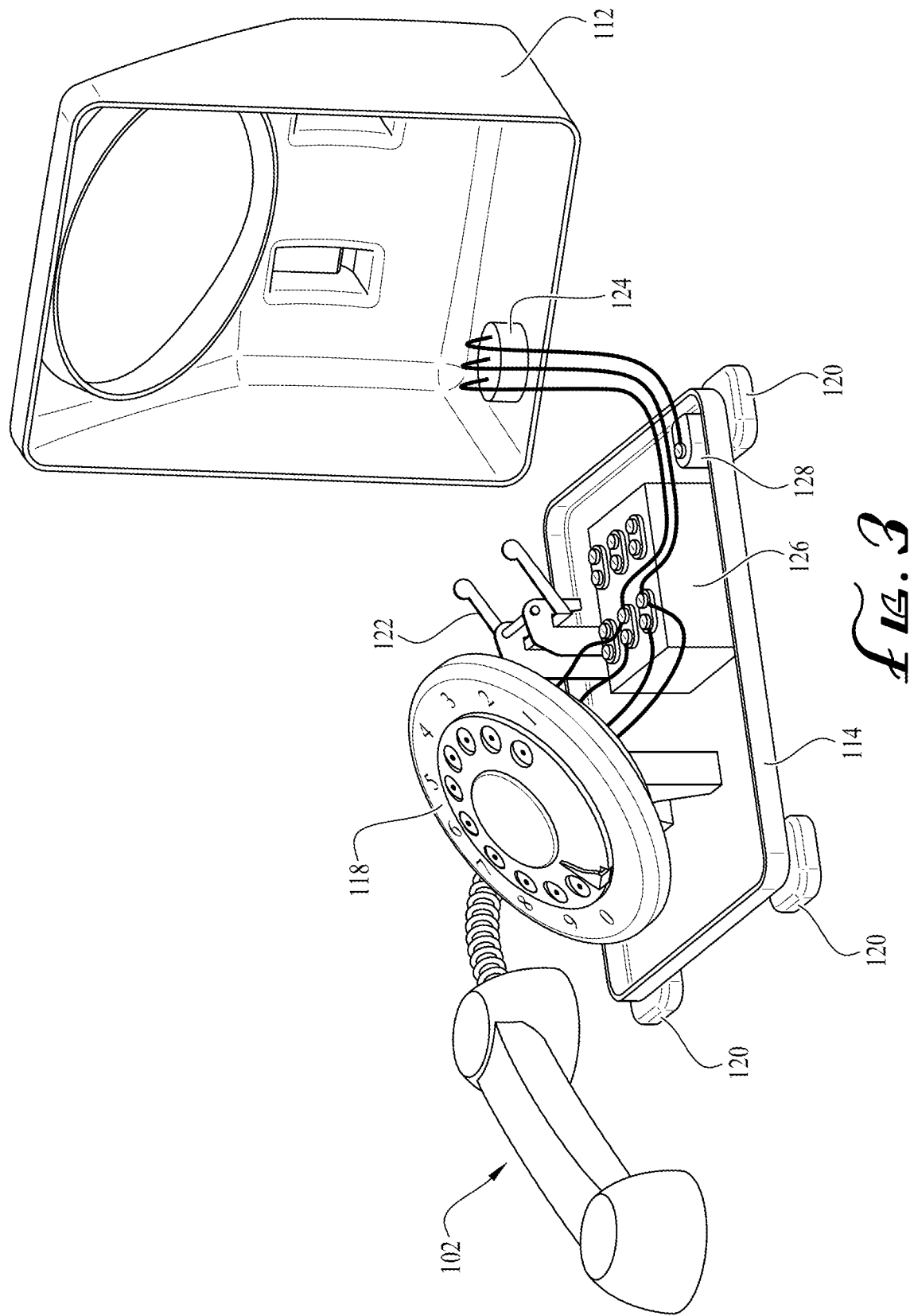
FIG. 3 is a front perspective view of the device of FIG. 1, wherein a top of the device has been removed, and internal components of the device are shown.
Figure 4:
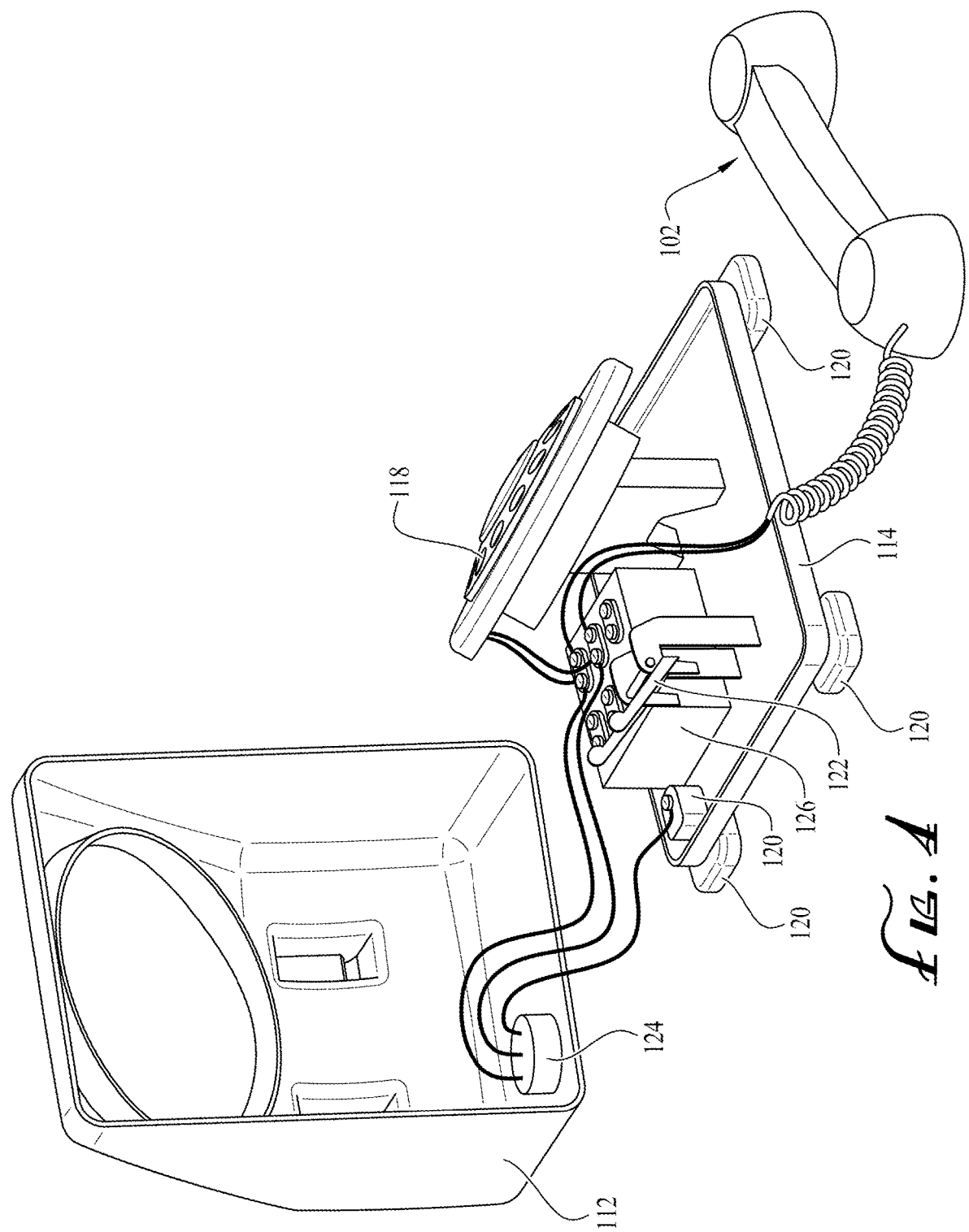
FIG. 4 is a rear perspective view of the device of FIG. 3.

Referring now to FIGS. 3 and 4, the internal components of the device 100 can be seen. As noted above, the body 104 comprises a top cover 114 and a base 116. The upper surface of the base 116 supports the internal components of the device 100. Those internal components comprise a hook switch 122, a terminal network 126, and a ground lug 128. An XLR connector 124 is coupled to the integral surface of the top cover 112.

The hook switch 118 is an electrical switch that indicates when the handset 102 is hung up. The hook switch 118 extends into the supports 116 that support the handset 102. When the handset 102 is lifted off the supports 116, the hook switch 118 is triggered and a pre-recorded audio recording is played. After the audio recording is played, the handset 102 then switches into recording mode and records whatever the user says into the handset 102. The hook switch 118 is physically mounted on the upper surface of the base 114 and is electrically coupled to the terminal network 126.

The XLR connector 124 is physically coupled to the internal surface of the upper cover 112 and is electrically coupled to the terminal network 126. The XLR connector 124 is a type of electrical connector primarily found on professional audio, video, and stage lighting equipment. The connector 124 is circular n design and has between three and seven pins. The XLR connector 124 utilizes an XLR cable (not shown) to connect the device 100 to an external recorder and/or data storage device (not shown). Optionally, instead of an XLR connector, a ¼ inch jack or a 3.5 mm jack could be used instead.

The external recorder and/or data storage device can be, but is not limited to, an external hard drive, a computer, cloud-based storage, a tablet, a cell phone, a device that hold computer memory, a USB drive, and a recorder comprising an SD card. The data storage device stores all of the messages left by users using the device 100. Optionally, a telephone handset recording USB adapter can be used to record the messages and send the recorded audio to a computer via USB.

The terminal network 126 is the electrical board/circuitry that receives and transmits the audio input from the guest to the external recorder. The terminal network is electrically coupled to the handset 102 by a telephone wire.

Optionally, instead of the terminal network, an Arduino chip can be used, and Arduino chip can be programed such that when the handset is lifted and the rotary dial is rotated, the device 100 plays a prompt and then begins to record using a small audio interface.

The ground lug 128 is physically coupled to/mounted on the upper surface of the base 114 and electrically coupled to the XLR connector 124. The ground lug is a lug that connects a grounding conductor to a grounding electrode and grounds the device 100, preventing a short.

In use, the device 100 is placed at a location that is easily accessible by the guests at an event. When a guest chooses to leave a message or well-wish to the hosts, the guest simply lifts the handset 102 off the supports 116 listens to the pre-recorded message, and then speaks into the handset 102, leaving a message which the device 100 records and saves.

Guests no longer have to physically write messages/sign guest books with a pen and paper. Instead, the guests can simply talk into the device 100 and leave an audio message for their hosts.

The device 100 also permits the guests to leave more personal messages, as the messages are recorded and saved into the device 100 and cannot be publicly listened to at the event. In contrast, if a guest were to leave a message for the hosts via pen and paper in a guest book, the message would be available for viewing by all the other guests as the guest book can be easily flipped through and its contents read. Accordingly, the device 100 of the present invention provides increased privacy and intimacy between the guests and their hosts when leaving messages.

The device 100 also provides an increased level of fun and interaction between the guests. It can be more enjoyable to leave an audio message than to handwrite a message. Moreover, guests can easily convey tone and other emotions when leaving an audio message. Tone and emotion can be difficult to convey via a written message.

Optionally, a Bluetooth gateway could be used to control a cell phone or other wireless tele device. A Bluetooth gateway is a low-power device that connects smart devices to Bluetooth-based products when nearby. It enables one to transmit information from Bluetooth devices to the cloud. These devices can either be sensors or Ble beacons. A virtual phone number could be set up for a customer (the party to which the voicemails are to be sent to you), and the device 100 can be used to control the cell phone and call the custom number. Recordings can be saved in the cloud.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference.

Features of the Invention Include:

1. A recording device comprising:
   a) a base having an upper surface and a lower surface;
   b) a top cover having an internal surface and an external surface, the top cover being removably coupled to the base;
   c) a handset removably supported by the top cover;
   d) a plurality of feet coupled to the lower surface of the base for supporting the device;
   e) a terminal network coupled to the upper surface of the base;
   f) a hook switch coupled to the upper surface of the base, and electrically coupled to the terminal network;

f) an XLR connector coupled to the internal surface of the top cover, and electrically coupled to the terminal network; and h) a ground lug coupled to the upper surface of the base, and electrically coupled to the XLR connector.

What is claimed is:

1. A recording device comprising:
   a) a base having an upper surface and a lower surface;
   b) a top cover removably coupled to the base and having:
      i) an internal surface;
      ii) an external surface;
      iii) a central opening and
      iv) two supports;
   c) a terminal network coupled to the upper surface of the base;
   d) a hook switch coupled to the upper surface of the base, and electrically coupled to the terminal network, wherein the hook switch extends up into the two supports when the top cover is coupled to the base;
   e) an XLR connector coupled to the internal surface of the top cover and electrically coupled to the terminal network;
   f) a ground lug coupled to the upper surface of the base and electrically coupled to the XLR connector;
   g) a rotary dial coupled to the base and configured to extend through the central opening in the top cover;
   h) a handset removably supported by the top cover and electrically coupled to the terminal network, the handset having:
      i) a first end that contains a microphone;
      ii) a second end that contains a speaker; and
      iii) a central handle portion disposed between the two ends; and
   i) an external recorder and/or data storage device configured for coupling to the XLR connector.

2. A recording device comprising:
   a) a base having an upper surface and a lower surface;
   b) a top cover removably coupled to the base and having at least one support;
   c) a terminal network coupled to the upper surface of the base;
   d) a hook switch coupled to the upper surface of the base, and electrically coupled to the terminal network, wherein the hook switch extends up into the at least one support when the top cover is coupled to the base;
   e) an XLR connector coupled to the internal surface of the top cover and electrically coupled to the terminal network;
   f) a ground lug coupled to the upper surface of the base and electrically coupled to the XLR connector;
   g) a rotary dial coupled to the base;
   h) a handset removably supported by the top cover and electrically coupled to the terminal network; and
   i) an external recorder and/or data storage device configured for coupling to the XLR connector.

3. The device of claim 2, wherein the top cover further comprises:
   a) an internal surface;
   b) an external surface; and
   c) a central opening.

4. The device of claim 2, wherein the handset has:
   a) a first end that contains a microphone;
   b) a second end that contains a speaker; and
   c) a central handle portion disposed between the two ends.

5. The device of claim 3, wherein the rotary dial is configured to extend through the central opening in the top cover.

6. A recording device comprising:
   a) a base having an upper surface and a lower surface;
   b) a top cover removably coupled to the base;
   c) a terminal network coupled to the upper surface of the base;
   d) a hook switch coupled to the upper surface of the base, and electrically coupled to the terminal network;
   e) an XLR connector coupled to the internal surface of the top cover and electrically coupled to the terminal network;
   f) a ground lug coupled to the upper surface of the base and electrically coupled to the XLR connector;
   g) a rotary dial coupled to the base;
   h) a handset removably supported by the top cover and electrically coupled to the terminal network by a telephone wire; and
   i) an external recorder and/or data storage device configured for coupling to the XLR connector.

7. The device of claim 6, wherein the top cover has:
   a) an internal surface;
   b) an external surface;
   c) a central opening; and
   d) at least one support.

8. The device of claim 7, wherein the hook switch extends up into the at least one support when the top cover is coupled to the base.

9. The device of claim 7, wherein the rotary dial is configured to extend through the central opening in the top cover.

10. The device of claim 7, wherein the handset has:
    a) a first end that contains a microphone;
    b) a second end that contains a speaker; and
    c) a central handle portion disposed between the two ends.

11. A method of using a recording device, the method comprising the steps of:
    a) providing the device of claim 1;
    b) lifting the handset from the device;
    c) speaking into the handset to leave a new message; and
    d) recording and saving the new message.

12. A method of using a recording device, the method comprising the steps of:
    a) providing the device of claim 2;
    b) lifting the handset from the device;
    c) speaking into the handset to leave a new message; and
    d) recording and saving the new message.

13. A method of using a recording device, the method comprising the steps of:
    a) providing the device of claim 6;
    b) lifting the handset from the device;
    c) speaking into the handset to leave a new message; and
    d) recording and saving the new message.

14. A recording device comprising:
    a) a base having an upper surface and a lower surface;
    b) a top cover removably coupled to the base;
    c) an XLR connector coupled to the internal surface of the top cover and electrically coupled to the handset;
    d) a rotary dial coupled to the base;
    e) a handset removably supported by the top cover and electrically coupled to the XLR connector; and
    f) an external recorder and/or data storage device configured for coupling to the XLR connector.

15. The device of claim 14, wherein the top cover has:
    a) an internal surface;
    b) an external surface;
    c) a central opening; and
    d) at least one support.

16. The device of claim 15, wherein the rotary dial is configured to extend through the central opening in the top cover.

17. The device of claim 15, wherein the handset has:
a) a first end that contains a microphone;
b) a second end; and
c) a central handle portion disposed between the two ends.

18. A method of using a recording device, the method comprising the steps of:
a) providing the device of claim 14;
b) lifting the handset from the device;
c) speaking into the handset to leave a new message; and
d) recording the new message.

* * * * *